(12) United States Patent
Feng et al.

(10) Patent No.: US 7,924,531 B2
(45) Date of Patent: Apr. 12, 2011

(54) SUSPENSION AND FABRICATING METHOD THEREOF, HEAD GIMBAL ASSEMBLY AND DISK DRIVE DEVICE

(75) Inventors: XianWen Feng, Dong Guan (CN); YiuSing Ho, Hong Kong (CN)

(73) Assignee: SAE Magnetics (H. K) Ltd., Hong Kong (CN)

( * ) Notice: Subject to any disclaimer, the term of this patent is extended or adjusted under 35 U.S.C. 154(b) by 971 days.

(21) Appl. No.: 11/790,965

(22) Filed: Apr. 30, 2007

(65) Prior Publication Data

US 2008/0266714 A1  Oct. 30, 2008

(51) Int. Cl.
*G11B 5/48* (2006.01)

(52) U.S. Cl. .................................................. 360/245.3

(58) Field of Classification Search .............. 360/234.5, 360/234.6, 245.3, 245.8, 245.9
See application file for complete search history.

(56) References Cited

U.S. PATENT DOCUMENTS

| | | | |
|---|---|---|---|
| 6,515,832 B1 * | 2/2003 | Girard | 360/245.3 |
| 7,006,330 B1 * | 2/2006 | Subrahmanyam et al. | 360/234.5 |
| 7,113,372 B2 * | 9/2006 | Segar et al. | 360/245.9 |
| 7,391,594 B2 * | 6/2008 | Fu et al. | 360/234.5 |
| 7,660,079 B2 * | 2/2010 | Yao et al. | 360/294.3 |
| 7,701,673 B2 * | 4/2010 | Wang et al. | 360/245.3 |
| 2004/0143959 A1 * | 7/2004 | Kamigama | 29/603.03 |
| 2008/0266714 A1 * | 10/2008 | Feng et al. | 360/234.6 |

* cited by examiner

*Primary Examiner* — Angel A. Castro
(74) *Attorney, Agent, or Firm* — Nixon & Vanderhye P.C.

(57) ABSTRACT

A suspension for supporting a head slider has a flexure, several trace patterns positioned on the flexure, front flexure-bonding pads disposed on the flexure at a position corresponding to a leading edge of the head slider and connected to the trace patterns, and rear flexure-bonding pads disposed on the flexure at a position corresponding to a trailing edge of the head slider and connected to the trace patterns. The front and the rear flexure-bonding pads and the trace patterns are integrally formed and disposed on the flexure at the same time, so the fabricating process is simplified and there is no alignment problem for bonding location. This can ensure the connection strength and position between the head slider and the suspension changeless and, in turns, ensure a good attitude of the head slider. The invention also discloses a HGA and a disk drive device with such suspension, and a fabricating method for the suspension.

15 Claims, 15 Drawing Sheets

SUSPENSION AND FABRICATING METHOD THEREOF, HEAD GIMBAL ASSEMBLY AND DISK DRIVE DEVICE

FIELD OF THE INVENTION

The present invention relates to an information recording disk drive device and components thereof. More particularly, the present invention relates to a suspension with structures capable of attaching a head slider thereto using only one type of connection technology, and relates to a head gimbal assembly (HGA) with such suspension, a disk drive device with the HGA, and a method for fabricating such suspension.

BACKGROUND OF THE INVENTION

Disk drive devices are information storage devices that use magnetic media to store data and a movable read/write magnetic head positioned over the magnetic media to selectively read data from and write data to the magnetic media.

Typically, referring to FIG. 1, a disk drive device contains a number of magnetic disks 6 attached to a common spindle motor for rotation. The surface of the magnetic disk 6 suspends an associated head arm assembly that includes a HGA 1. The HGA 1 is generally attached to and mounted on a drive arm 4. A voice coil motor (VCM) 5 is connected to the drive arm 4 for controlling the motion of the drive arm 4 and, in turn, controlling a magnetic head incorporated by a head slider 2 of the HGA 1 to position with reference to data tracks across the surface of the magnetic disk 6, thereby enabling the magnetic head to read data from or write data to the disk 6.

The HGA 1 serves to dynamically adjust the orientation of the head slider 2 to conform to the disk surface while the disk 6 is being spun by the spindle motor. More specifically, the HGA 1 generally comprises a suspension to load or suspend the head slider 2 thereon. The suspension includes a load beam, a base plate, a hinge and a flexure 3, all of which are assembled together. The load beam is connected to the base plate by the hinge, and the base plate is used to enhance structure stiffness of the whole HGA 1. The flexure 3 is made of flexible material and runs from the hinge to the load beam. One end of the load beam is mounted to the drive arm 4 by means of the base plate, and the other end of the load beam is attached to the flexure 3. The load beam biases the head slider toward the surface of the magnetic disk, while the flexure 3 provides flexibility for the head slider. A suspension tongue is provided at an end of the flexure to carry the head slider 2 thereon.

Referring to FIG. 2, conventionally, the head slider 2 typically has a sensor provided on a trailing surface 23 thereof for reading and writing data on the concentric data tracks of the disk 6, as is well known in the art. For electrical connection, the sensor provides several bonding pads 24 formed on the trailing surface 23 of the head slider 2, and the flexure 3 provides corresponding bonding pads 10 which are already common with sensor traces extending from a read/write electronic circuit (not shown) of the disk drive. The sensor traces serve to conduct signals between the sensor and the read/write electronic circuit for control. The bonding pads 24 of the sensor are respectively soldered or ultrasonically bonded with bonding pads 10 of the flexure 3 via solder or metal balls 8 thus implementing electrical connection therebetween. In addition, for achieving a strong physical bonding performance, epoxy adhesive 7 is applied to a top or mounting surface 22 of the head slider 2 facing the flexure 3 and opposite the air bearing surface 21 of the head slider 2, and the epoxy adhesive 7 bonds the mounting surface 22 of the head slider 2 to the flexure 3.

However, the method for interconnection the head slider 2 and the flexure 3 of the suspension described above is complicated. As is illustrated above, the head slider 2 is designed to be attached with the flexure 3 firstly by bonding solder or metal balls 8 between corresponding pads and secondly by applying epoxy adhesive 7 to fix the head slider 2 and the flexure 3 firmly. The electrical and mechanical connection between the head slider 2 and the flexure 3 are two separate assembly processes, which are time-consuming and laborious. Furthermore, the connection by epoxy adhesive has some inherent flaws, such as an elevated temperature is needed to cure the epoxy adhesive, while the elevated temperature will damage the sensor of the head slider.

At present, a more advanced typical interconnection between the head slider and the suspension has been introduced to solve the above problems. As shown in FIG. 3, the head slider 30 provides a plurality of slider electrical bonding pads 31, 31' on the leading edge and a plurality of slider electrical bonding pads 32A-32D on the trailing edge opposite to the leading edge thereof, and the suspension 40 provides a plurality of corresponding flexure electrical bonding pads 41, 41' and 42A-42D at its leading side and trailing side corresponding to the leading edge and the trailing edge of the head slider separately. The slider electrical bonding pads 31, 31', 32A-32D are bonded to the respective flexure electrical bonding pads 41, 41', 42A-42D via bonding solder or metal balls to establish mechanical and electrical interconnection between the head slider 30 and the suspension 40. In this connection way, however, the suspension 40 should provide extra electrical bonding pads 41, 41' at the leading side so as to connect the head slider 2 with the suspension 40 at the leading side. Since the flexure bonding pads 41, 41' at the leading side, trace patterns 43, and electrical bonding pads 42A-42D at the trailing side are separate parts, they can but be fabricated separately. When disposing the flexure bonding pads 41, 41' onto the suspension 40 by photo process, a slight error in position alignment of the flexure bonding pads 41, 41' will cause big variation of connection force, and cause the head slider's pitch static attitude and roll static attitude to vary following the variation of the connection position, and accordingly, the variation of pitch and roll static attitude will cause variation of slider flying height, which degrades flying performance of the head slider, as well as data reading/writing performance.

Hence, a need has arisen for providing means and method for attaching the head slider to the suspension in a single way to simplify the fabricating process and improve the head slider's flying performance.

SUMMARY OF THE INVENTION

Accordingly, an object of the present invention is to provide a suspension to support a head slider. The suspension provides front and rear flexure-bonding pads at positions corresponding to a leading edge and a trailing edge of the head slider respectively which enables to attach the head slider to the suspension in a single way without using epoxy adhesive. Furthermore, the flexure-bonding pads are connected to trace patterns, so the flexure-bonding pads and the trace patterns can be disposed on the suspension at the same time. Therefore, there is no alignment problem for bonding location which, in turns, ensures the connection strength and position between the head slider and the suspension changeless, thereby reducing variation of the head slider's pitch static attitude and roll static attitude and improving flying performance of the head slider, as well as data reading/writing performance.

A further object of the present invention is to provide a HGA which attaches a head slider thereto in a single way without using epoxy adhesive, and ensures the connection strength and position between the head slider and the suspension changeless, thereby reducing variation of the head slider's pitch static attitude and roll static attitude and improving flying performance of the head slider, as well as data reading/writing performance.

Another object of the present invention is to provide a disk drive device with good data reading/writing performance.

Still another object of the present invention is to provide a method of fabricating the suspension which integrally forms front and rear flexure-bonding pads and trace patterns and disposes the front and the rear flexure-bonding pads and the trace patterns on its flexure at the same time to simplify the fabricating process and ensure the bonding location in alignment.

To achieve the above-mentioned objects, the present invention provides a suspension for supporting a head slider comprising a flexure and a plurality of trace patterns disposed on the flexure. The suspension further has at least one front flexure-bonding pad which is disposed on the flexure at a position corresponding to a leading edge of the head slider and connected to one of the trace patterns, and at least one rear flexure-bonding pad which is disposed on the flexure at a position corresponding to a trailing edge of the head slider and connected to one of the trace patterns.

In an embodiment of the invention, the front flexure-bonding pad is connected to ground.

Preferably, the front flexure-bonding pad is connected to the rear flexure-bonding pad so that the front and the rear flexure-bonding pads are connected to common ground.

As another embodiment of the present invention, the suspension further comprises an attitude control layer, and the attitude control layer is covered on the flexure and/or the trace patterns.

As still another embodiment of the present invention, the attitude control layer is integrally formed with the flexure and extends above the trace patterns.

The HGA of the present invention comprises a head slider having at least one front slider-bonding pad at a leading edge thereof, at least one rear slider-bonding pad at a trailing edge thereof, and a suspension. The suspension comprises a flexure and a plurality of trace patterns disposed on the flexure. The suspension further has at least one front flexure-bonding pad which is disposed on the flexure at a position corresponding to the leading edge of the head slider and connected to one of the trace patterns, and at least one rear flexure-bonding pad which is disposed on the flexure at a position corresponding to the trailing edge of the head slider and connected to one of the trace patterns. The front and the rear flexure-bonding pads are connected to the front and the rear slider-bonding pads of the head slider respectively.

The disk drive device of the present invention comprises a HGA, a drive arm to connect with the HGA, a disk and a spindle motor to spin the disk. The HGA comprises a head slider having at least one front slider-bonding pad at a leading edge thereof, at least one rear slider-bonding pad at a trailing edge thereof, and a suspension. The suspension comprises a flexure and a plurality of trace patterns disposed on the flexure. The suspension further has at least one front flexure-bonding pad which is disposed on the flexure at a position corresponding to a leading edge of the head slider and connected to one of the trace patterns, and at least one rear flexure-bonding pad which is disposed on the flexure at a position corresponding to a trailing edge of the head slider and connected to one of the trace patterns. The front and the rear flexure-bonding pads are connected to the front and the rear slider-bonding pads of the head slider respectively.

A method of fabricating the suspension according to the present invention comprises steps of: (1) providing a flexure; (2) integrally forming a plurality of trace patterns and front and rear flexure-bonding pads, the front flexure bonding pad being connected to one of the trace patterns, and the rear flexure-bonding pad being connected to one of the trace patterns; and (3) simultaneously disposing the trace patterns and the front and the rear flexure-bonding pads on the flexure.

As an embodiment of the present invention, the method further comprises a step of providing an attitude control layer and covering the attitude control layer on the flexure.

In comparison with the prior art, the present invention not only connects the head slider to the suspension in a single way without using epoxy adhesive, but also connects the flexure-bonding pads to the trace patterns so as to simultaneously dispose the flexure-bonding pads and the trace patterns on the flexure, thereby simplifying the fabricating process and avoiding alignment problem for bonding location. This can ensure the connection strength and connection location between the head slider and the suspension changeless, accordingly reduce variation of the head slider's pitch static attitude and roll static attitude and improve flying performance of the head slider, as well as data reading/writing performance.

In addition, the front and the rear flexure-bonding pads are connected with each other and connected to common ground so that the head slider has equal potential level at the leading edge and the trailing edge thereof, thus, improves the head slider the performance of preventing electrostatic discharge.

Moreover, the attitude control layer serves as a datum plate for supporting the head slider, so the head slider can be easily aligned with the flexure so as to ensure a good attitude of the head slider, thereby further improve flying performance of the head slider, as well as data reading/writing performance.

Other aspects, features, and advantages of this invention will become apparent from the following detailed description when taken in conjunction with the accompanying drawings, which are a part of this disclosure and which illustrate by way of example, principles of this invention.

BRIEF DESCRIPTION OF THE DRAWINGS

The accompanying drawings facilitate an understanding of the various embodiments of this invention. In such drawings:

FIG. 15b is a partial cross sectional view of a HGA with the suspension shown in FIG. 15a;

DETAILED DESCRIPTION OF ILLUSTRATED EMBODIMENTS

Figure 1:
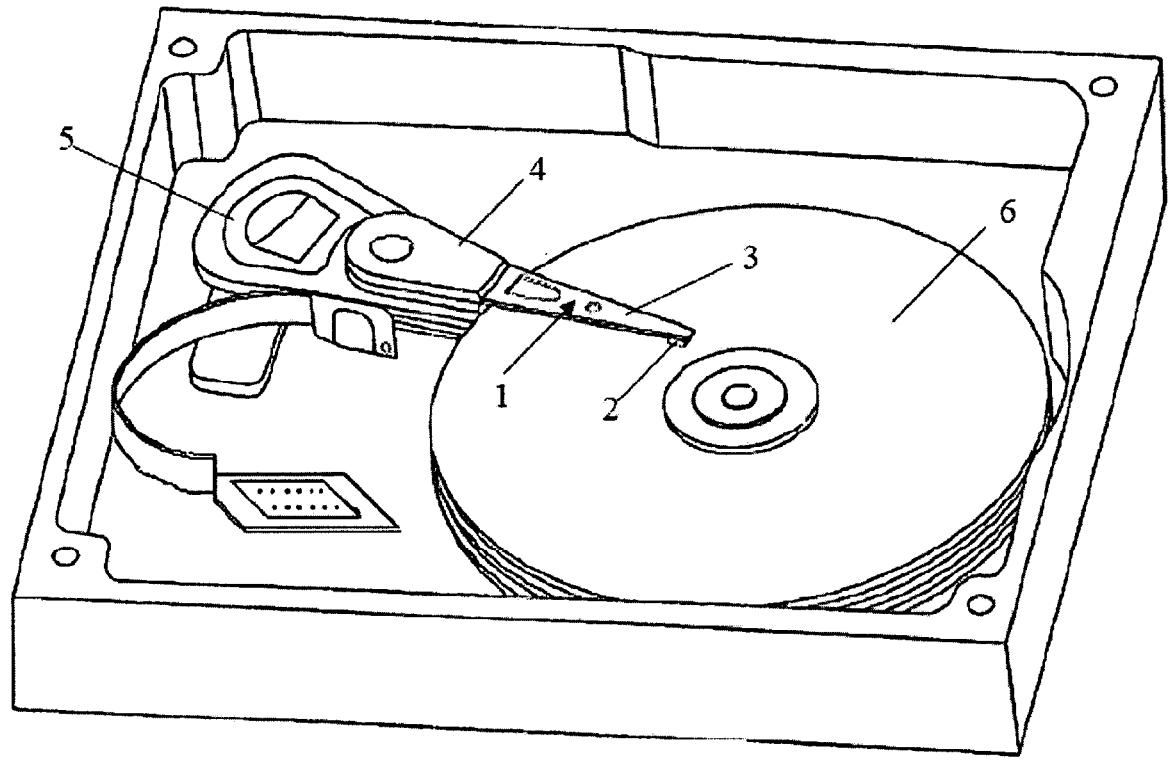
FIG. 1 is a perspective view of a conventional disk drive device.
Figure 2:
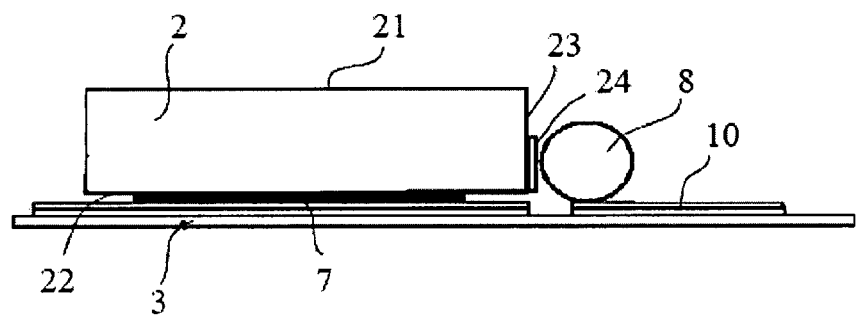
FIG. 2 is a partial side view of a conventional HGA of the disk drive device shown in FIG. 1, illustrating a head slider electrically connecting to a suspension at a trailing edge thereof and mechanically connecting to the suspension at a mounting surface thereof.
Figure 3:
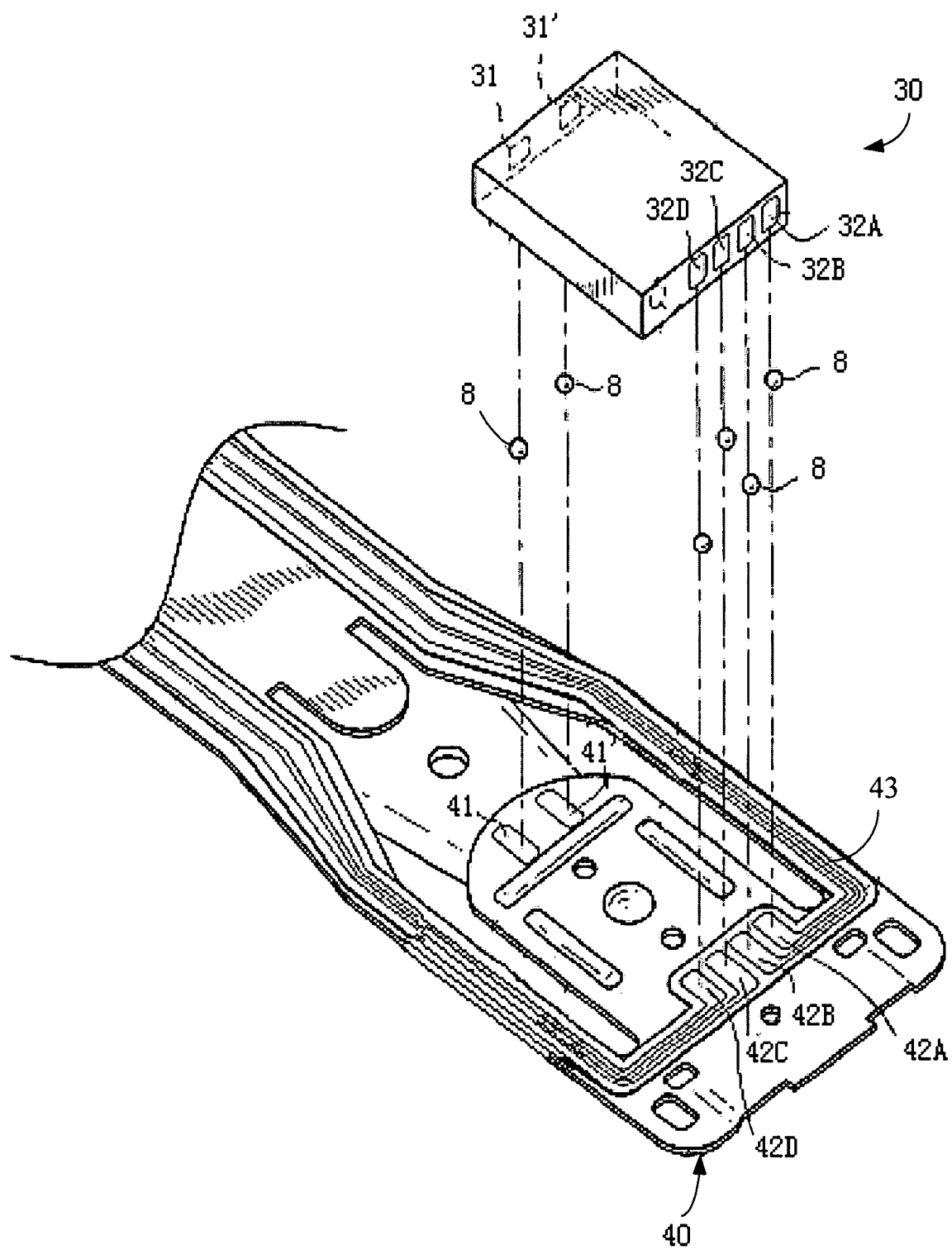
FIG. 3 is an exploded perspective view of another conventional HGA whose head slider is connected to its suspension in an improved way, illustrating the head slider having front and rear slider-bonding pads at a leading edge and a trailing edge thereof respectively connected to front and rear flexure-bonding pads at a leading side and a trailing side of its flexure.
Figure 4:
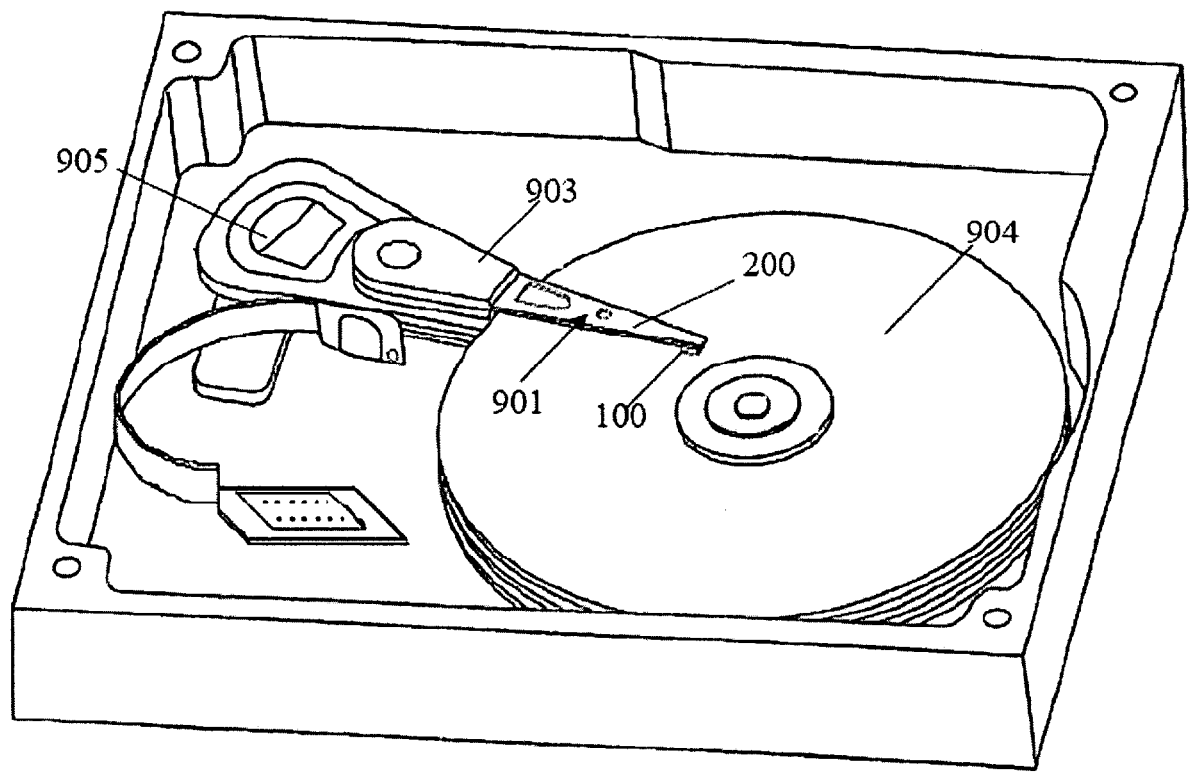
FIG. 4 is a perspective view of a disk drive device according to the present invention.
Figure 5:
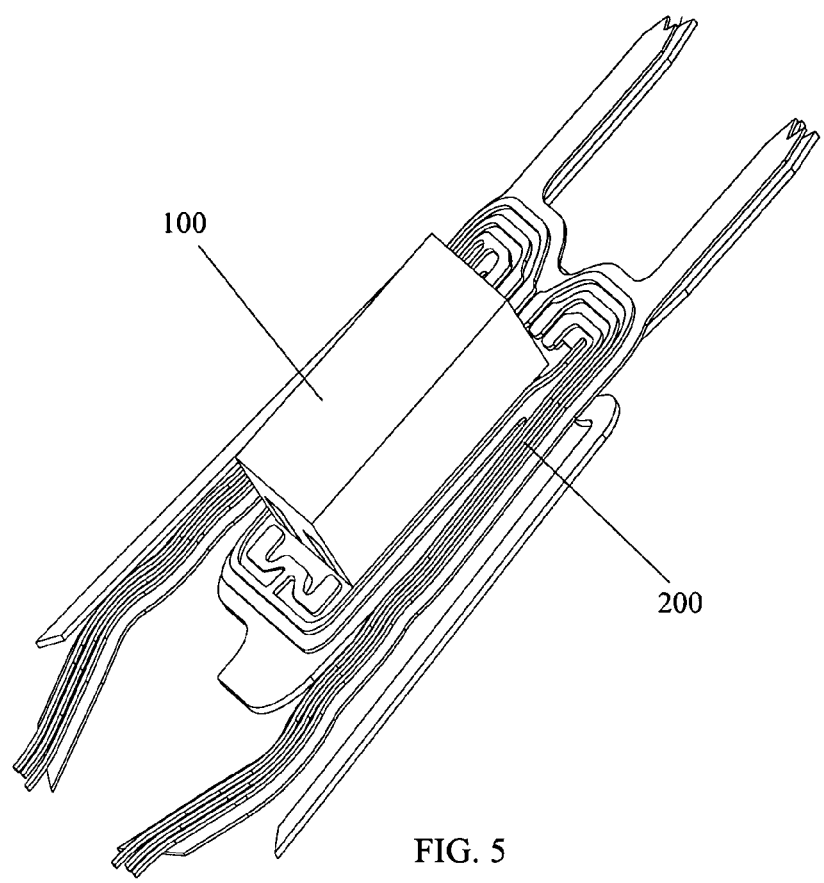
FIG. 5 is a partially enlarged assembled perspective view of a first embodiment of a HGA according to the present invention.

Various preferred embodiments of the invention will now be described with reference to the figures, wherein like reference numerals designate similar parts throughout the various views. Referring now more particularly to the accompanying drawings, FIG. 4 is a perspective view of a disk drive device in accordance with the present invention, and FIG. 5 is a partially enlarged perspective view of a HGA of the disk drive device. To appreciate the principles of the configuration and construction of the embodiments of the HGAs and the magnetic disk drive device, it may be useful to explain the well-known components as well as the distinct components of this invention hereinafter.

As shown in FIG. 4, the magnetic disk drive includes a stack of spaced apart magnetic recording disks 904 rotatable about a common shaft and a head stack assembly includes a HGA 901. The HGA 901, which includes a head slider 100 and a suspension 200, is attached to a drive arm 903. The head stack assembly is rotatable about an axis of the drive arm 903 and is generally attached to a voice coil motor 905 which controls the motion of the drive arm 903 and, in turn, controls a magnetic head incorporated by the head slider 100 of the HGA 901 to position with reference to data tracks across the surface of the magnetic recording disk 904, thereby enabling the magnetic head to read data from or write data to the disk 904.

The suspension 200 includes a load beam and a flexure secured to the load beam by welding or gluing. The load beam serves to supply a directed force to the flexure and accordingly, biases the head slider 100 toward the surface of the associated magnetic recording disk, while the flexure provides flexibility for the head slider 100. Such type of property successfully maintains the head slider 100 in a balanced equilibrium position at a desired height above the disk surface. The flexure extends toward the drive arm assembly for connection to a read/write electronic circuitry which controls the movement of the head slider 100 in the operation.

Having thus described the state of the well-known components for the HGA and the magnetic disk drive, the invention claimed herein will now be illustrated according to FIGS. 5-22 which help to describe the principles of the subject HGA and the magnetic disk drive as well as the suspension.

Figure 8:
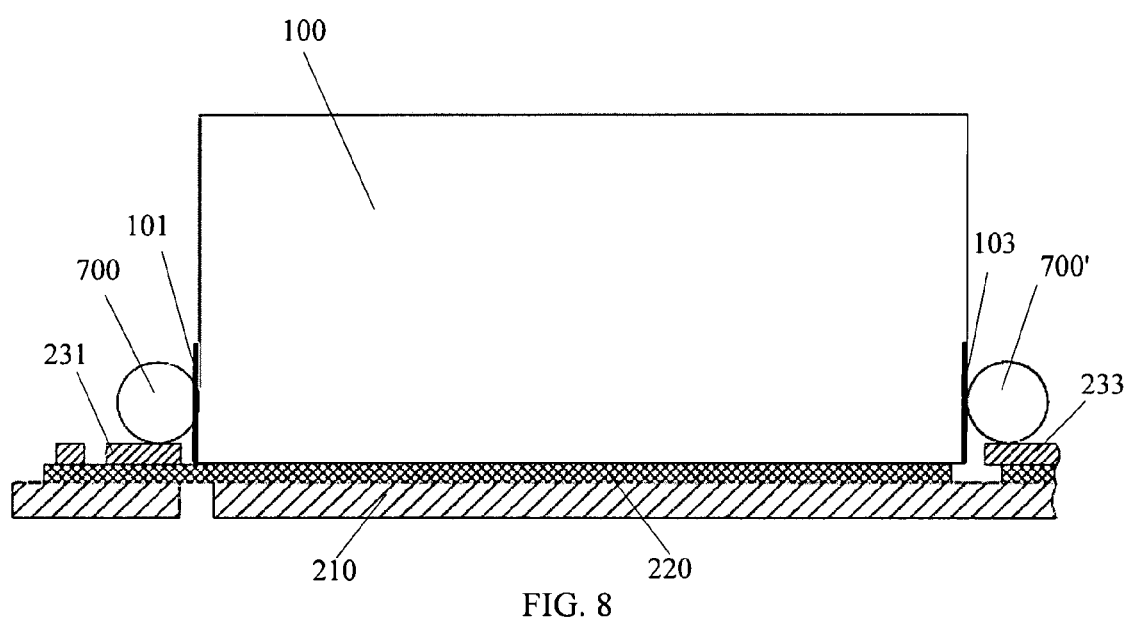
FIG. 8 is a partial cross sectional view of the HGA shown in FIG. 5.

FIG. 5 is a partially enlarged assembled perspective view of a first embodiment of a HGA according to the present invention, and FIG. 8 is a partial cross sectional view of the HGA of FIG. 5. Referring to FIG. 5 and FIG. 8, the head slider 100 has front slider-bonding pads 101 at the leading edge and rear slider-bonding pads 103 at the trailing edge thereof. The slider-bonding pads 101, 103 are bonded to the corresponding flexure-bonding pads 231, 233 on the suspension 200, which are electrically connected to the read/write circuit, via solder bonding balls or golden bonding balls 700, 700' (shown in FIG. 8) so that the solder bonding balls or golden bonding balls 700, 700' establish electrically connection between the head slider 100 and the read/write control circuit. The following details pertain primarily to the suspension 200.

Figure 6:
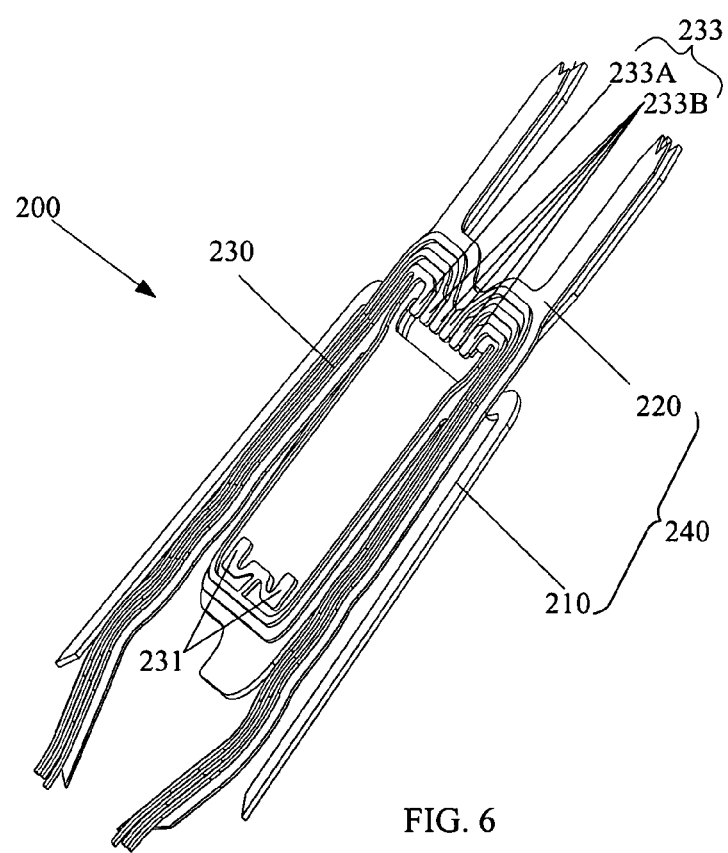
FIG. 6 is an assembled perspective view of a suspension of the HGA shown in FIG. 5.

FIG. 6 is an assembled perspective view of the suspension 200 of the HGA shown in FIG. 5 The suspension 200 includes several trace patterns 230 and a flexure 240 comprising an insulation layer 220 and a metal substrate 210.

The flexure-bonding pads 231, 233 are disposed on the insulation layer 220. The front flexure-bonding pad 231 which is corresponding to the front slider-bonding pads 101 is disposed at a position corresponding to the leading edge of the head slider on the insulation layer 220, and the rear flexure-bonding pad 233 which is corresponding to the rear slider-bonding pads 103 is disposed at a position corresponding to the trailing edge of the head slider on the insulation layer 220. The trace patterns 230 are also disposed on the insulation layer 220, one end of which is connected with associated front and rear flexure-bonding pads 231, 233, and the other end of which extends to reading/writing control circuit so as to connect the flexure-bonding pads 231, 233 to the reading/writing control circuit. In conjunction with FIG. 7, each of the trace patterns 230 is connected to the corresponding rear flexure-bonding pad 233, and the front flexure-bonding pad 231 is connected to one of the trace patterns 230, thus, the front flexure-bonding pad 231 is connected to the rear flexure-bonding pad 233, that is, the front flexure-bonding pad 231 and the rear flexure-bonding pad 233 are connected to the same trace pattern 230. Since both of the front and rear flexure-bonding pad 231 and 233 are connected with one trace pattern 230, the flexure-bonding pads 231, 233 and the trace patterns 230 can be stamped integrally of sheet copper or any other suitable material and positioned on the insulation layer 220 at the same time. Because of the integration of the front and the rear flexure-bonding pads 231, 233, the relative position therebetween is changeless all the time, namely, there is no alignment problem between the flexure-bonding pads 231, 233, thus easily ensure the slider-bonding pads 101, 103 on the leading edge and the trailing edge of the head slider 100 to connect to the flexure-bonding pads 231, 233 at the right positions. Preferably, the trace pattern 230 connected to the front flexure-bonding pad 231 is connected to the ground circuit of the reading/writing control circuit, that is, the front flexure-bonding pad 231 is connected to ground so as to prevent the electrostatic discharge (ESD) for the head slider 100. Since the rear flexure-bonding pad 233B is also connected to the same trace pattern 230, the rear flexure-bonding pad 233B is connected to ground too. The front and the rear flexure-bonding pads 231, 233B are connected to common ground. Thus, the leading edge and the trailing edge of the head slider 100 have equal potential level, which further increases the capacity of preventing ESD. Other trace patterns 230 are connected with the signal circuit of the reading/writing control circuit, so the rear flexure-bonding pad 233 connected to these trace patterns 230 are signal bonding pads 233A, while the rear flexure-bonding pad 233B is ground bonding pad.

Figure 7:
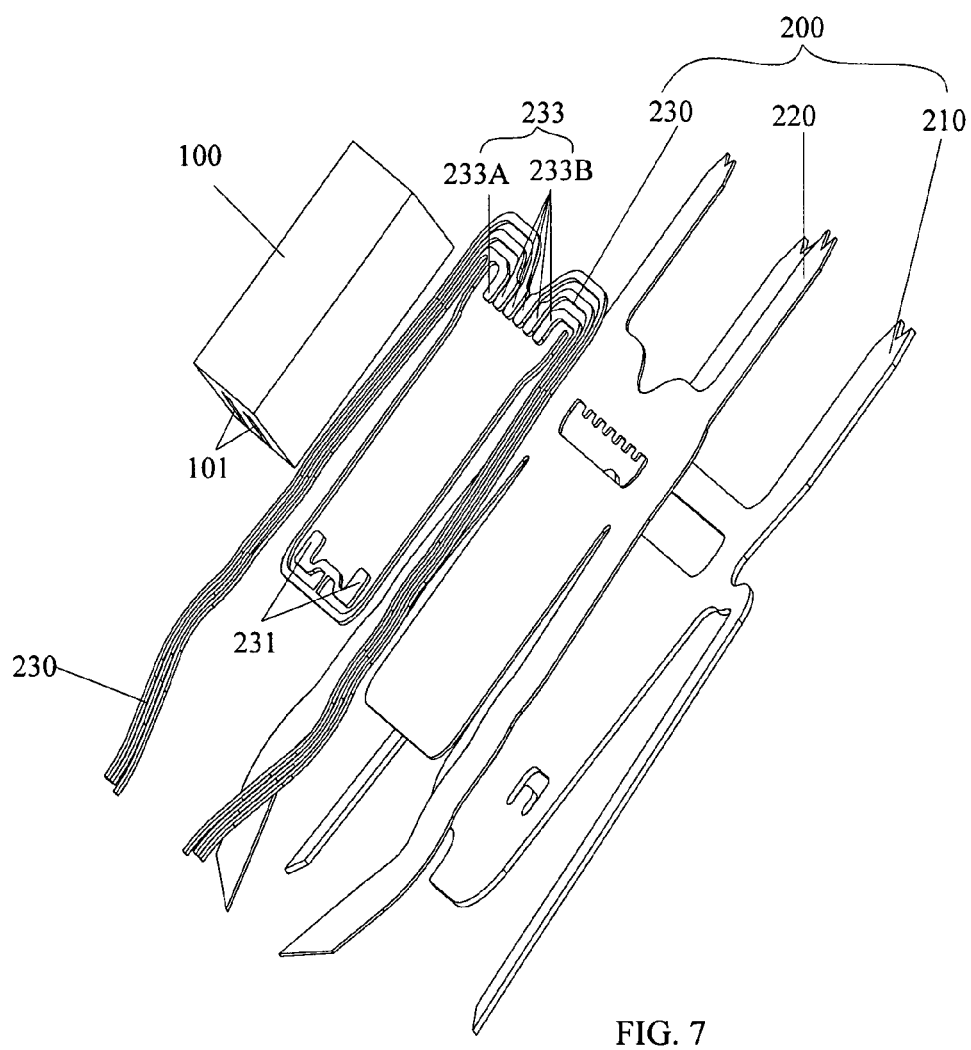
FIG. 7 is an exploded perspective view of the HGA shown in FIG. 5.

Now referring to FIG. 7 in junction with FIG. 8, the insulation layer 220 is sandwiched between the metal substrate 210 and the trace pattern 230. The insulation layer 220 is a flat, flexible sheet of material disposed on the metal substrate 210. The insulation layer 220 is made of plastic or polymeric resin material, such as polyimide. In the embodiment, the insulation layer 220 serves to electrically insulate the respective trace patterns 230 and the flexure-bonding pads 231, 233 from shorting.

The metal substrate 210 is formed under the insulation layer 220. Generally, the metal substrate 210 possesses a stress-releasable portion or structure that helps release thermal deformation of the suspension (especially the flexure) caused by ambient thermal temperature change. The metal substrate 210 can be formed of any suitable rigid material such as stainless steel.

FIG. 8 is a partial cross sectional view of the HGA shown in FIG. 5, illustrating the assembled state of the head slider 100 with the suspension 200 via solder balls 700, 700'. The head slider 100 is put directly and firstly on the insulation layer 220, and then the slider-bonding pads 101, 103 on the leading edge and the trailing edge of the head slider 100 are respectively and electrically bonded with associated solder ball 700, 700' which are already coupled to the associated flexure-bonding pads 231, 233 at leading side and trailing side. The ball bonding is implemented by ultra-sonic bonding or/and laser beam heating with solders. Because of the ball bonding, a conductive connection is built up between the slider-bonding pads 101, 103, solder balls 700, 700', and the flexure-bonding pads 231, 233, thus a controlling signal form the read/write electronic circuitry will be successfully conducted by the trace pattern 230, then the conductive connection excellently and reliably transfers the signals to the head slider 100, thereby correctly finishing the reading or writing operations in accordance with the signals. After the solders are solidified, the leading edge and the trailing edge of the head slider 100 are connected with the suspension 200 firmly. Hence, the electrical and mechanical connection between the head slider 100 and the suspension 200 is achieved via the single solder bonding method, and no epoxy adhesive is needed.

Figure 9:
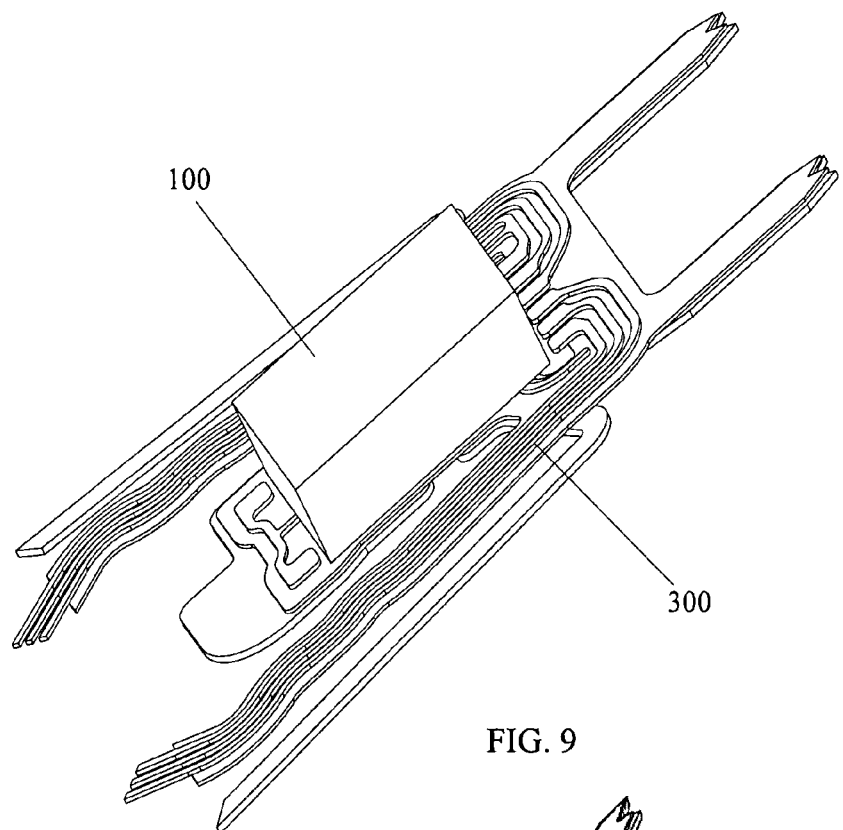
FIG. 9 is a partially enlarged assembled perspective view of a second embodiment of a HGA according to the present invention.
Figure 10:
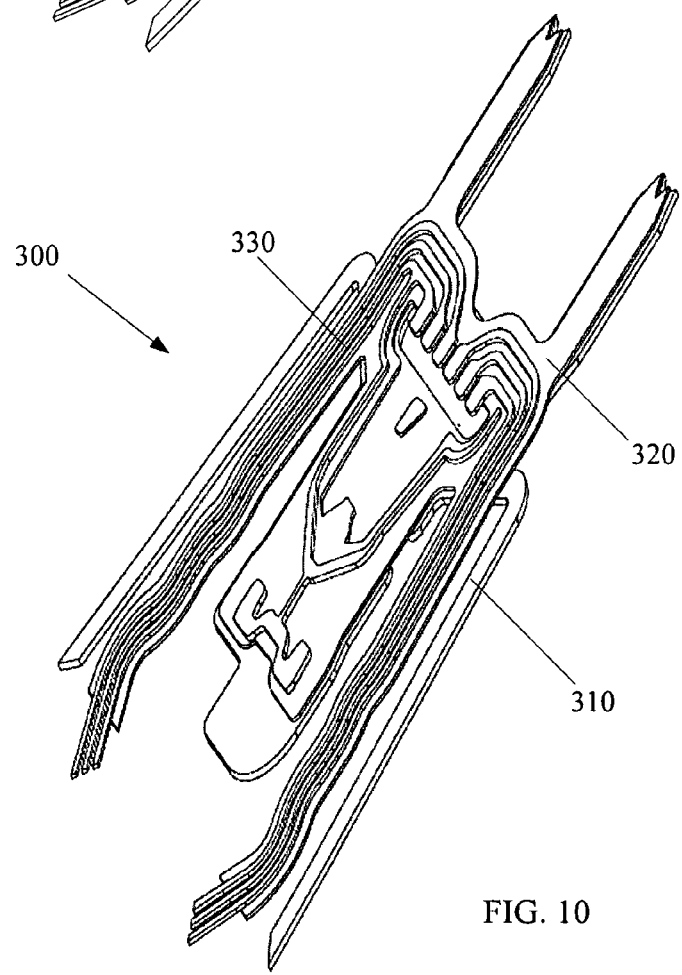
FIG. 10 is an assembled perspective view of a suspension of the HGA shown in FIG. 9.
Figure 11:
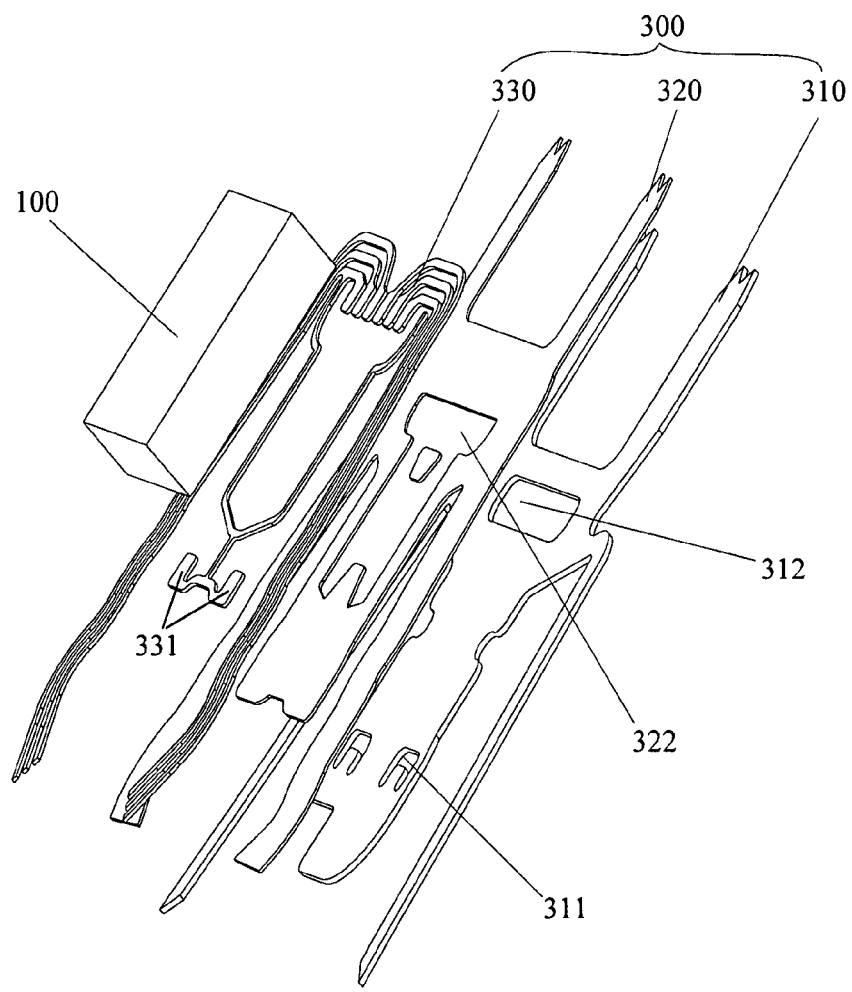
FIG. 11 is an exploded perspective view of the HGA shown in FIG. 9.
Figure 12:
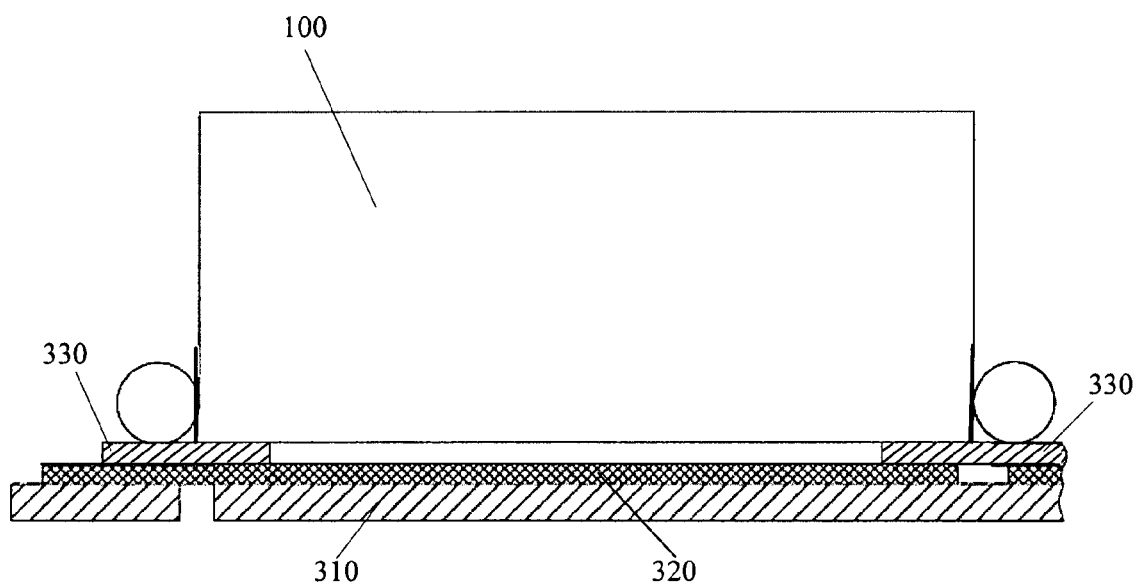
FIG. 12 is a partial cross sectional view of the HGA shown in FIG. 9.

FIG. 9 is an enlarged assembled perspective view of a second embodiment of a HGA according to the present invention. In junction with FIGS. 11-13, the suspension 300 includes a plurality of trace patterns 330, an insulation layer 320 and a metal substrate 310. The difference between the suspension 300 of the instant embodiment and the suspension 200 of the first embodiment is that the trace patterns 330 are shaped for supporting the head slider 100, and the metal substrate 310 has a through hole 312 under the associated through hole 322 of the insulation layer 320. The trace patterns 330 are designed to directly support the head slider 100. Such design is needed when area of a suspension tongue of the suspension is not enough to support the head slider 100. The stress-releasable portion 311 of the metal substrate 310 is partially hollowed out at positions under the front flexure-bonding pads 331 at leading side. Preferably, the stress-releasable portion 311 includes a plurality of cutouts or through holes symmetrically arranged. This design assists in evenly releasing stress in different directions, thus avoiding or at least reducing the thermal deformation of the flexure due to temperature change of the head slider 100, and of course yielding small slider static attitude as well as little slider crown change, finally improving reading/writing characteristics of the head slider 100.

Figure 13:
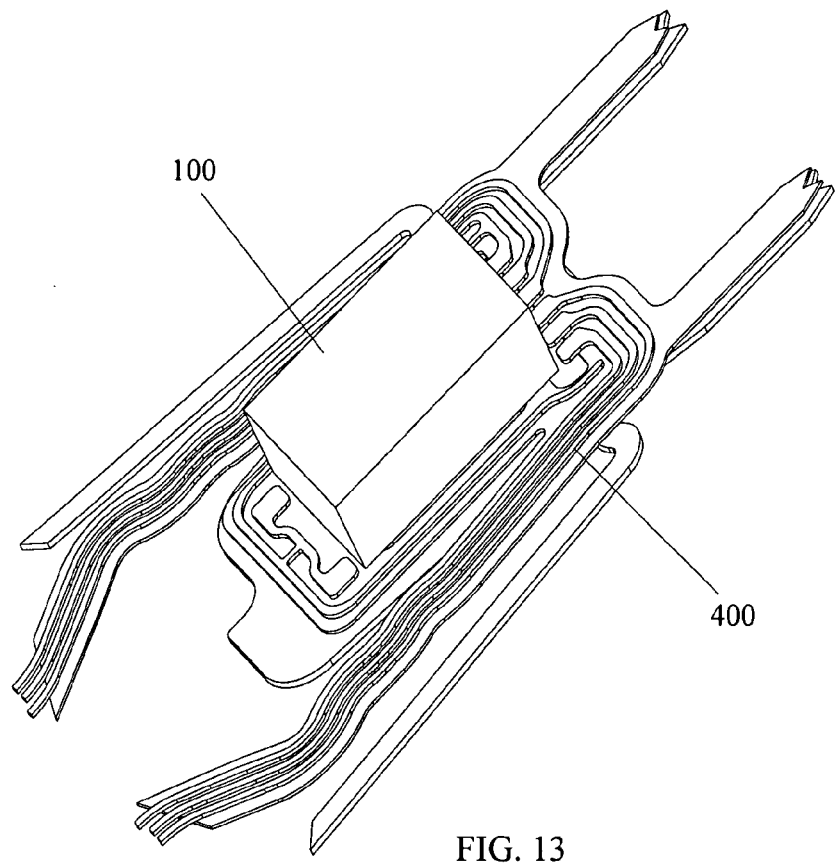
FIG. 13 is a partially enlarged assembled perspective view of a third embodiment of a HGA according to the present invention.
Figure 14:
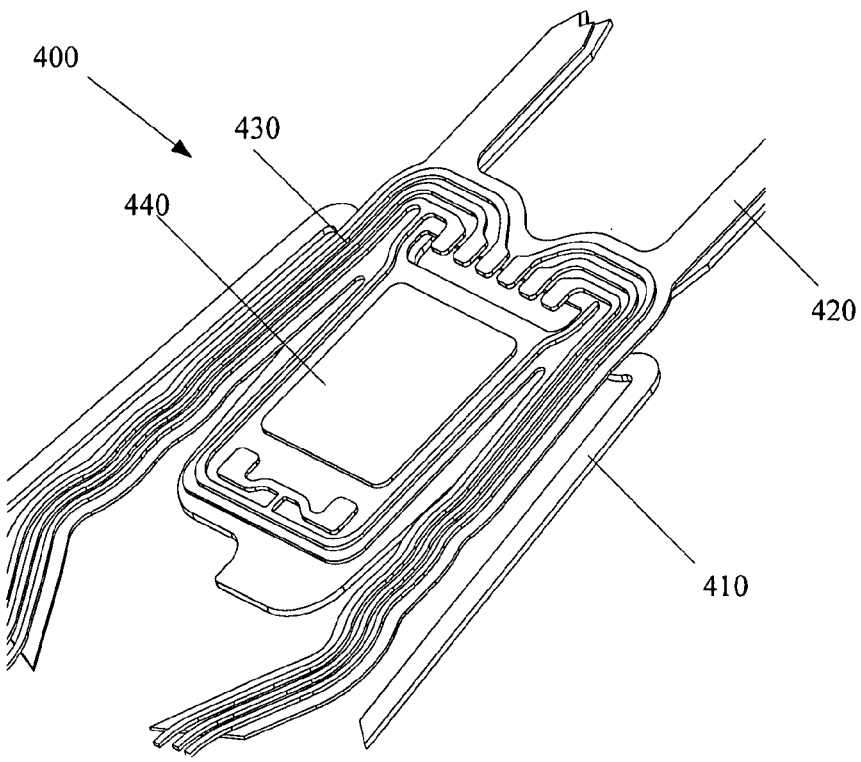
FIG. 14 is an assembled perspective view of a suspension of the HGA shown in FIG. 13.
Figure 14A:
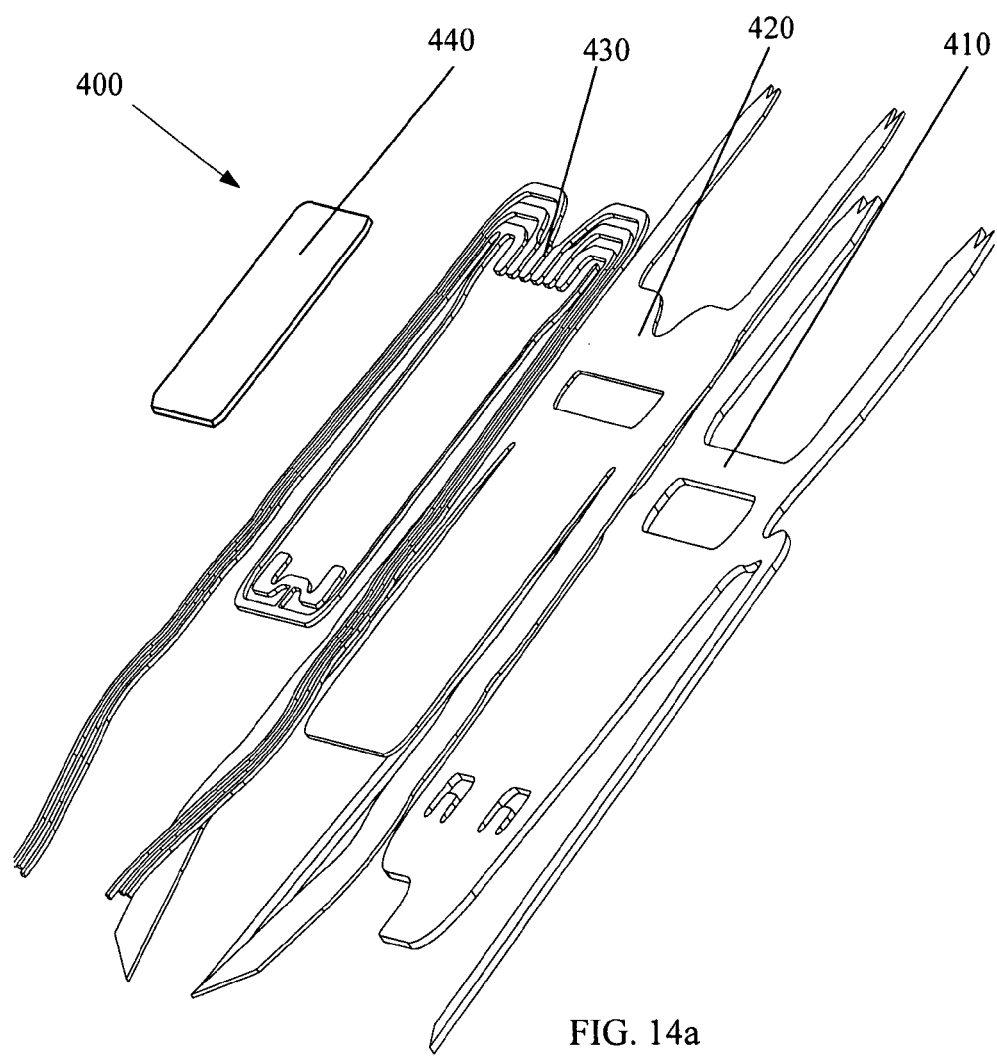
FIG. 14a is an exploded perspective view of the suspension shown in FIG. 14.
Figure 14B:
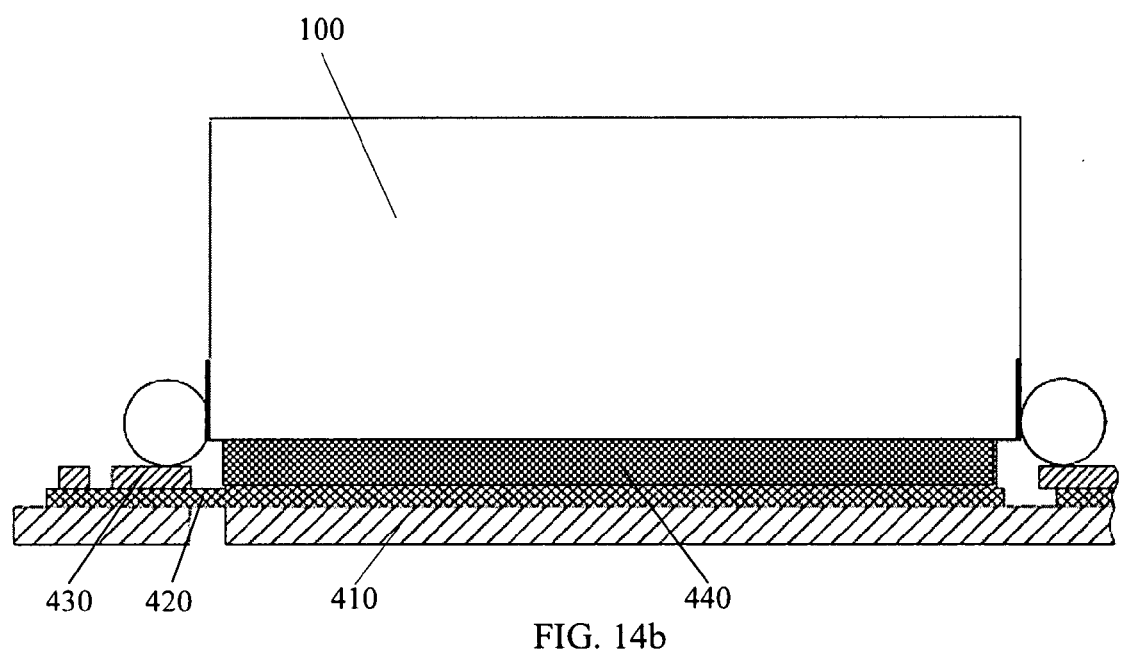
FIG. 14b is a partial cross sectional view of the HGA shown in FIG. 13.

FIG. 13 is a partially enlarged perspective view of a third embodiment of a HGA according to the present invention. In junction with FIG. 14, 14a, and 14b, the suspension 400 includes an attitude control layer 440, a plurality of trace patterns 430, an insulation layer 420, and a metal substrate 410. The trace patterns 430, the insulation layer 420 and the metal substrate 410 of the suspension 400 have similar structure with the above-mentioned trace patterns 230, the insulation layer 220 and the metal substrate 210 of the suspension 200. The difference between the suspensions 400 and 200 is that the suspension 400 further has an attitude control layer 440. The attitude control layer 440 is positioned between the head slider 100 and the suspension 400. The head slider 100 is directly put on the attitude control layer 440, so the attitude control layer 440 can serve as a datum plate to support the head slider 100 and help to align the head slider 100 and the bonding pads. This can ensure a good attitude of the head slider 100 after assembled. Especially, the attitude control layer 440 eliminates or at least reduces the variation of the head slider's pitch static attitude and roll static attitude and, in turns, maintains the flying height of the head slider, thereby improves the reading/writing performance of the head slider 100. As shown in FIGS. 14a-14b, in the present embodiment, the attitude control layer 440 is a separate part and covered on the insulation layer 420.

Figure 15A:
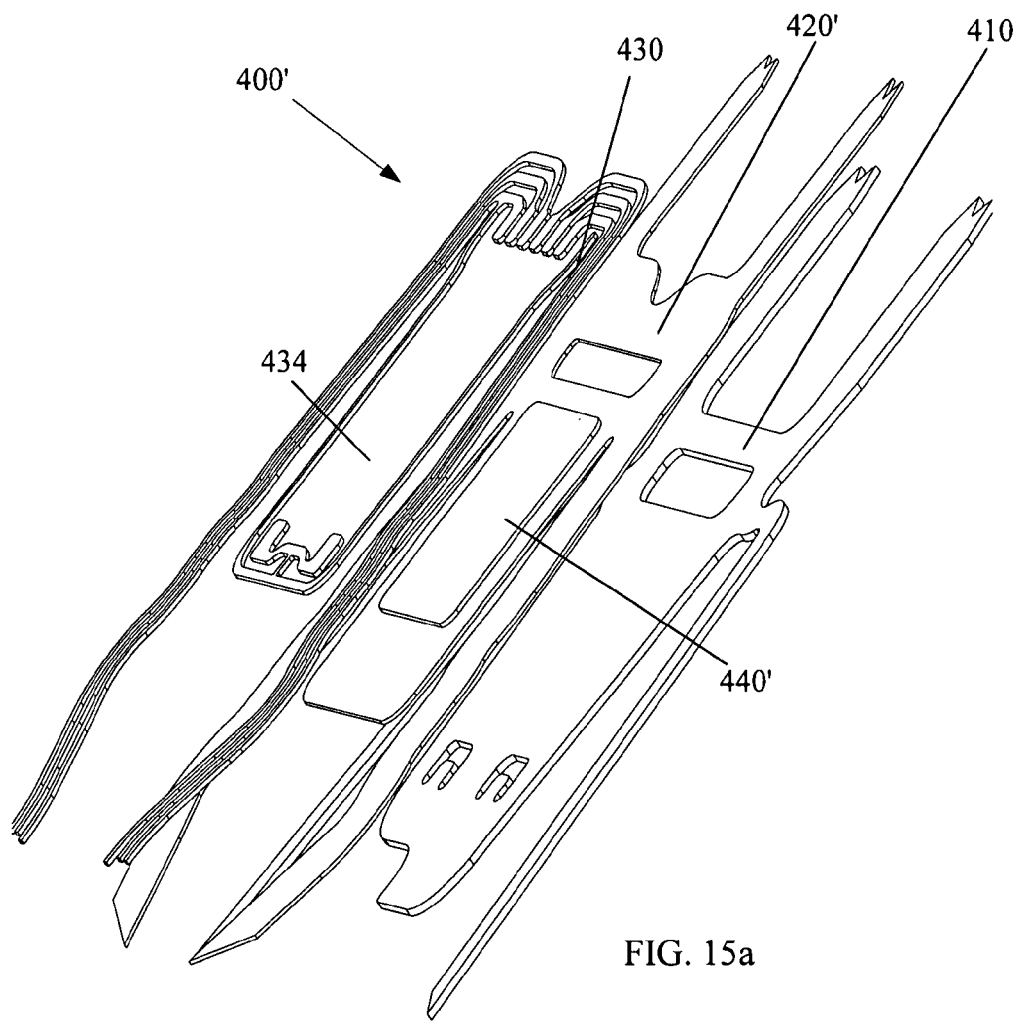
FIG. 15a is an exploded perspective view of a fourth embodiment of a suspension according to the present invention.
Figure 15B:
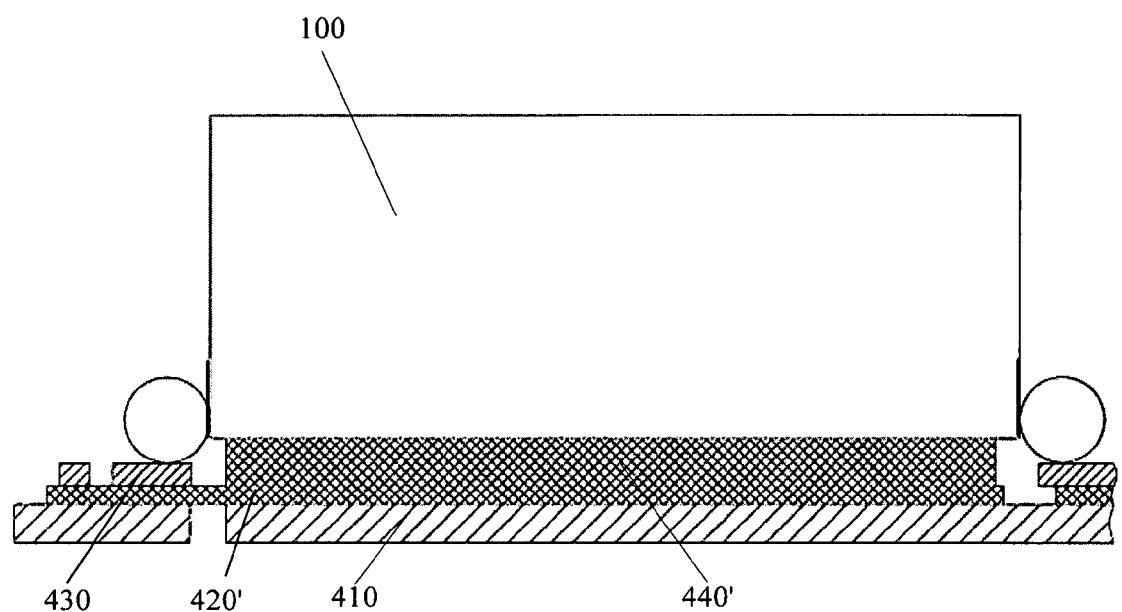

FIG. 15a is an exploded perspective view of a fourth embodiment of a suspension 400' according to the present invention. In junction with FIG. 15b, the suspension 400' includes an attitude control layer 440', a plurality of trace patterns 430, an insulation layer 420' and a metal substrate 410. The difference between the suspension 400' of the instant embodiment and the suspension 400 of the third embodiment is that the attitude control layer 440' and the insulation layer 420' are integrally formed with each other. The attitude control layer 440' extends above the trace patterns 430 through a hollowed portion 434 of the trace patterns 430 to support the head slider 100. Therefore, the attitude control layer 440' can also serve as a datum plate to support the head slider 100 and help to align the head slider 100 and the bonding pads.

Figure 16:
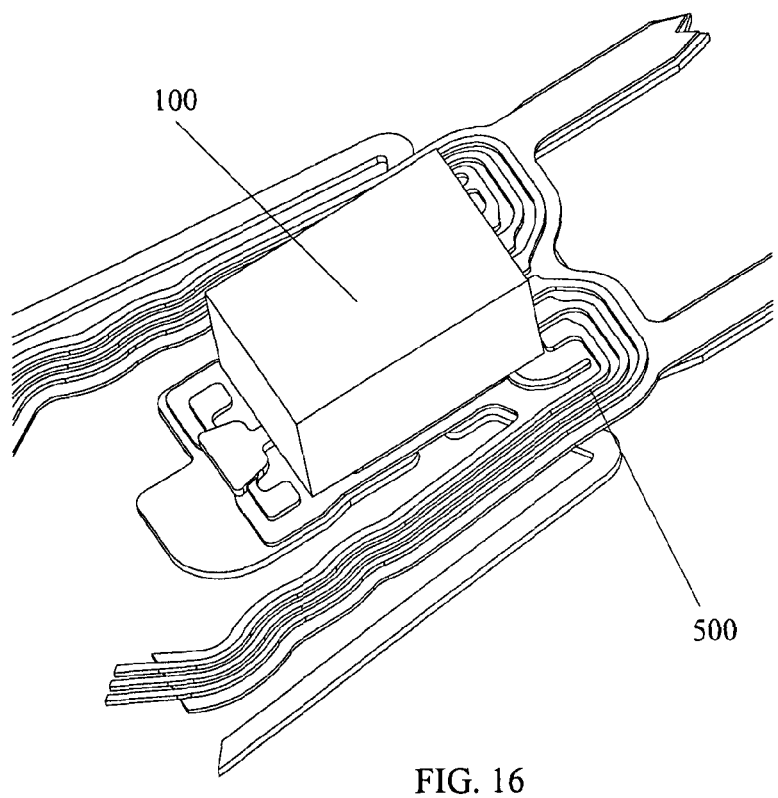
FIG. 16 is a partially enlarged assembled perspective view of a fifth embodiment of a HGA according to the present invention.
Figure 17:
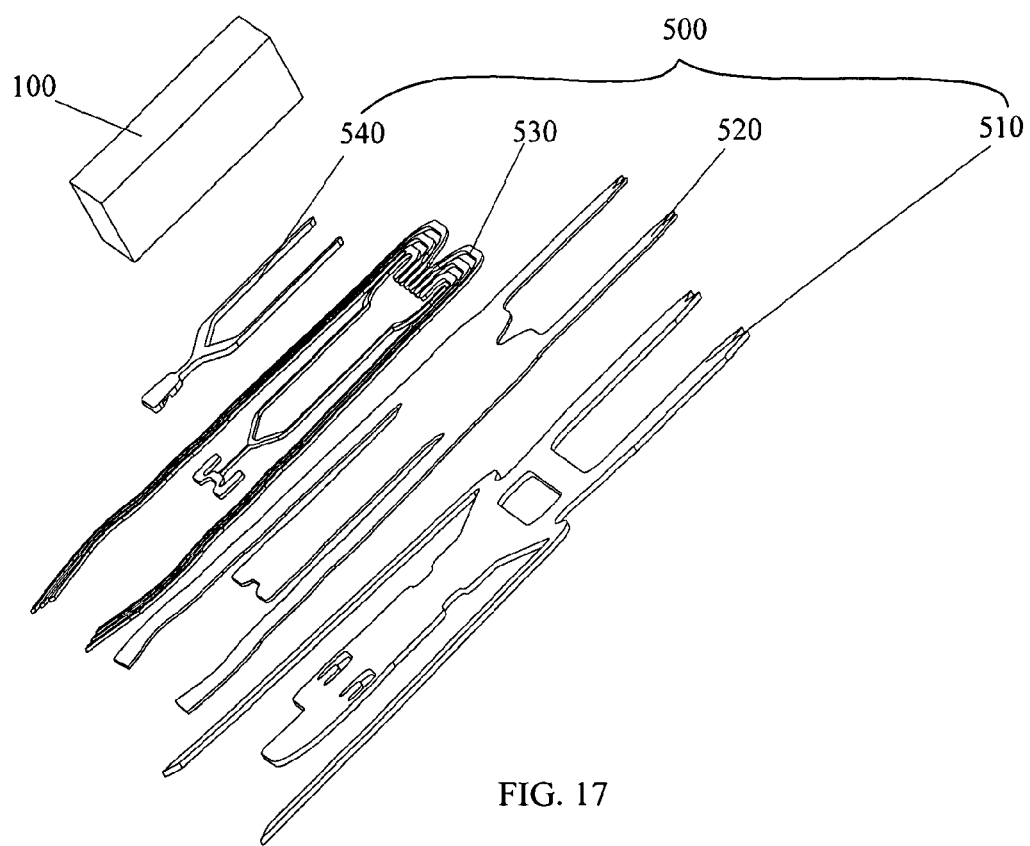
FIG. 17 is an exploded perspective view of the HGA shown in FIG. 16.
Figure 18:
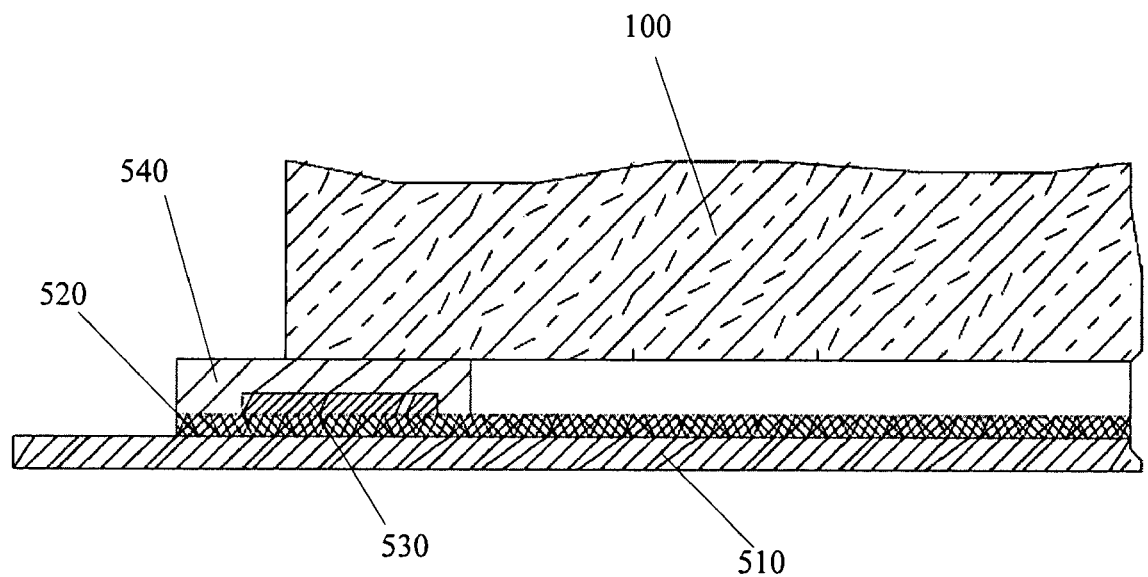
FIG. 18 is a partial cross sectional view of the HGA shown in FIG. 16.

FIG. 16 is an enlarged assembled perspective view of a fifth embodiment of a HGA according to the present invention. In junction with FIGS. 17-18, the suspension 500 includes an attitude control layer 540, a plurality of trace patterns 530, an insulation layer 520 and a metal substrate 510. The trace patterns 530, the insulation layer 520 and the metal substrate 510 of the suspension 500 have similar structure with the above-mentioned trace patterns 330, the insulation layer 320 and the metal substrate 310 of the suspension 300. The difference between the suspensions 500 and 300 is that the suspension 500 further has an attitude control layer 540. The attitude control layer 540 is designed to be tuning fork-shaped and partially covers on the trace patterns 530 to directly support the head slider 100.

Figure 19:
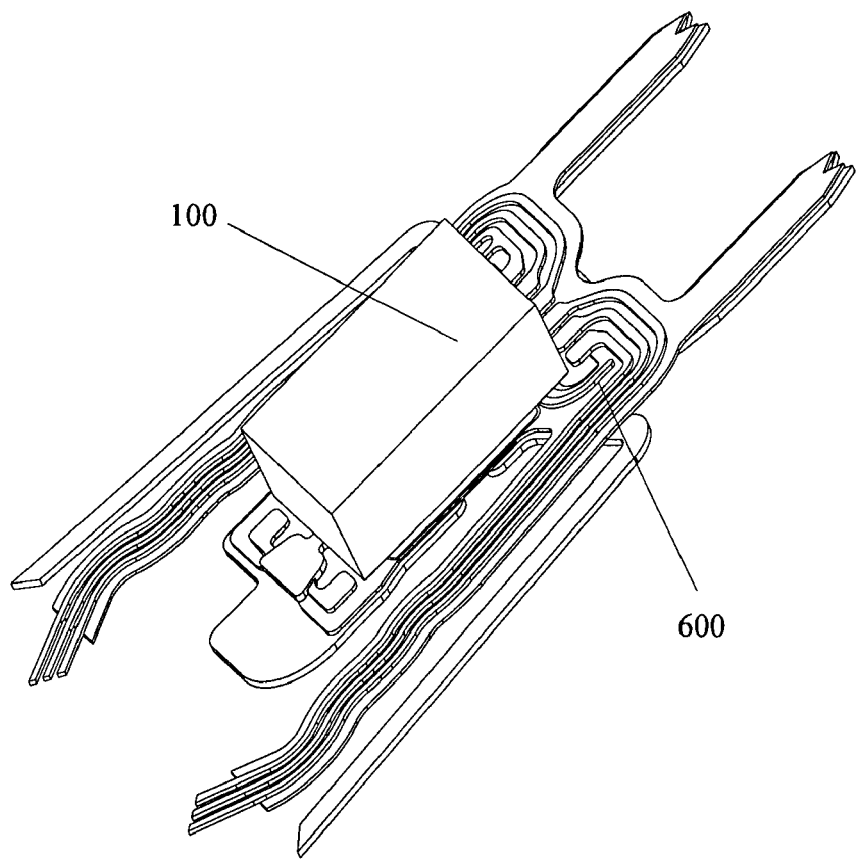
FIG. 19 is a partially enlarged assembled perspective view of a sixth embodiment of a HGA according to the present invention.
Figure 20:
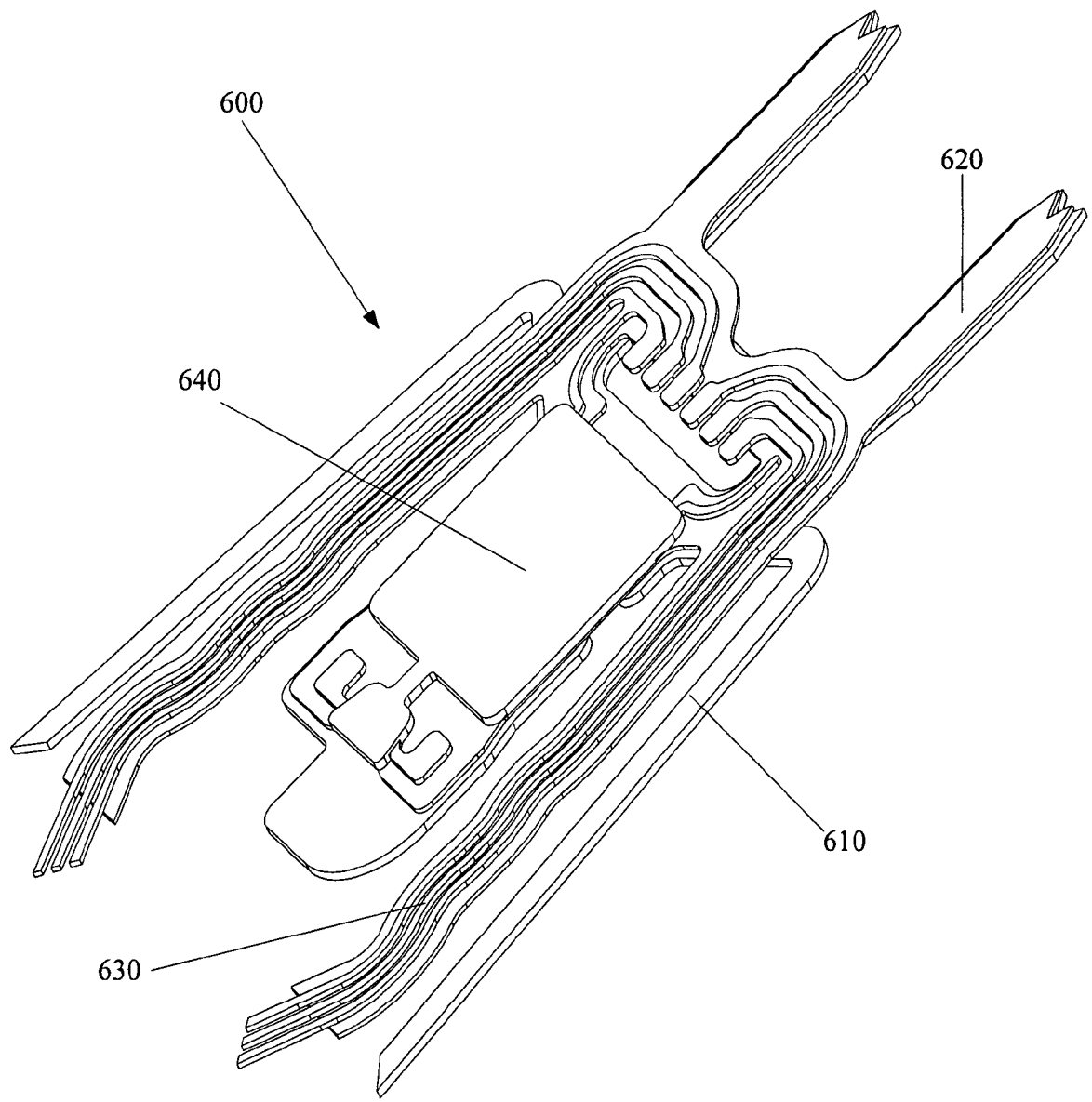
FIG. 20 is an assembled perspective view of a suspension of the HGA shown in FIG. 19.
Figure 21:
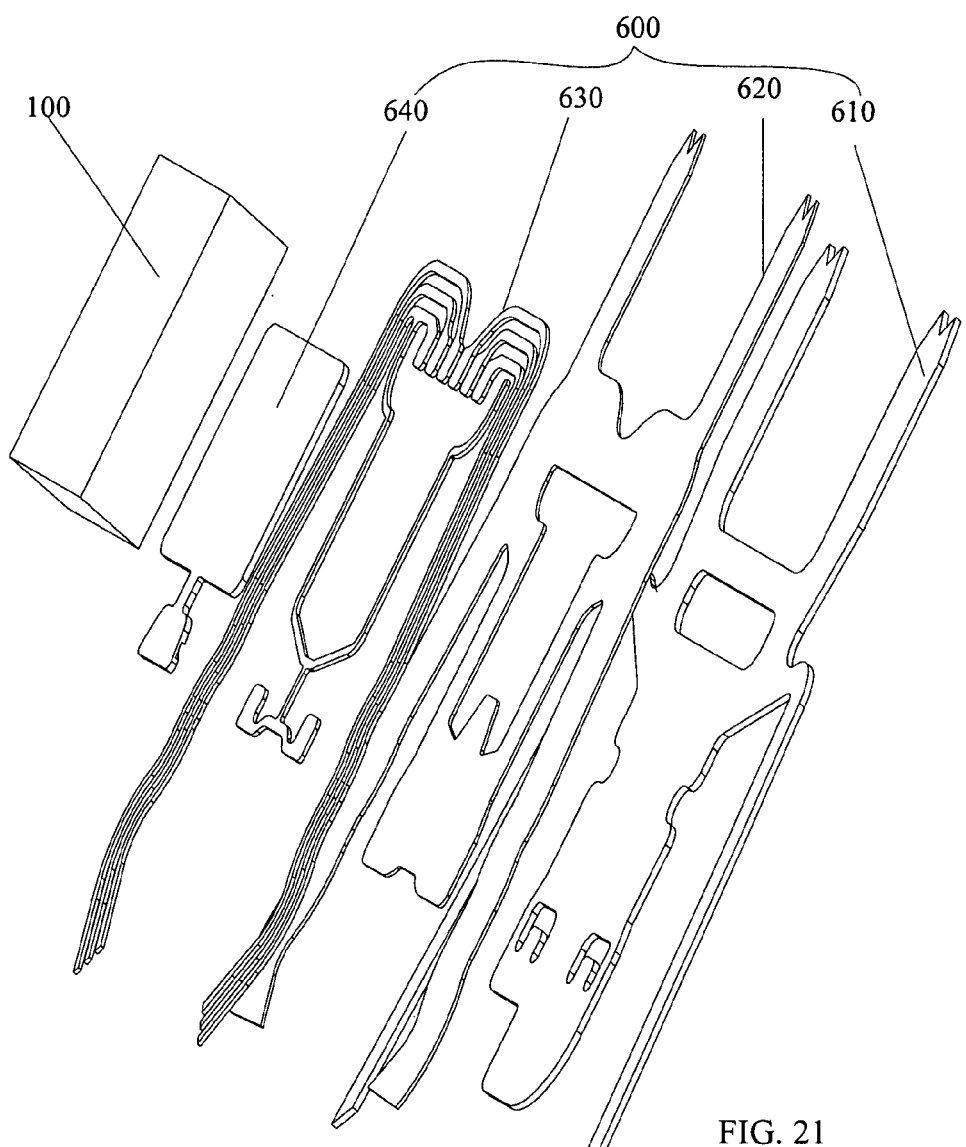
FIG. 21 is an exploded perspective view of the HGA shown in FIG. 19.
Figure 22:
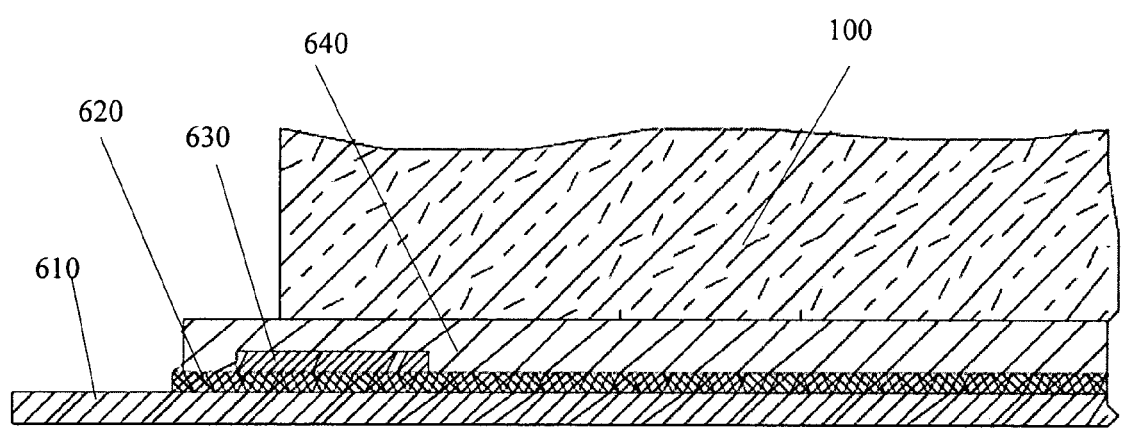
FIG. 22 is a partial cross sectional view of the HGA shown in FIG. 19.

FIG. 19 is an enlarged assembled perspective view of a sixth embodiment of a HGA according to the present invention. In junction with FIGS. 20-22, the suspension 600 includes an attitude control layer 640, a plurality of trace patterns 630, an insulation layer 620 and a metal substrate 610. The trace patterns 630, the insulation layer 620 and the metal substrate 610 of the suspension 600 have similar structure with the above-mentioned trace patterns 530, the insulation layer 520 and the metal substrate 510 of the suspension 500. The difference between the suspensions 600 and 500 is that the attitude control layer 640 is designed to be shovel-shaped and partially covers on the trace patterns 630 and the insulation layer 620. The head slider 100 is directly put on the attitude control layer 640, so the attitude control layer 640 can also serve as a datum plate to support the head slider 100 and help to align the head slider 100 and the bonding pads.

Figure 23:
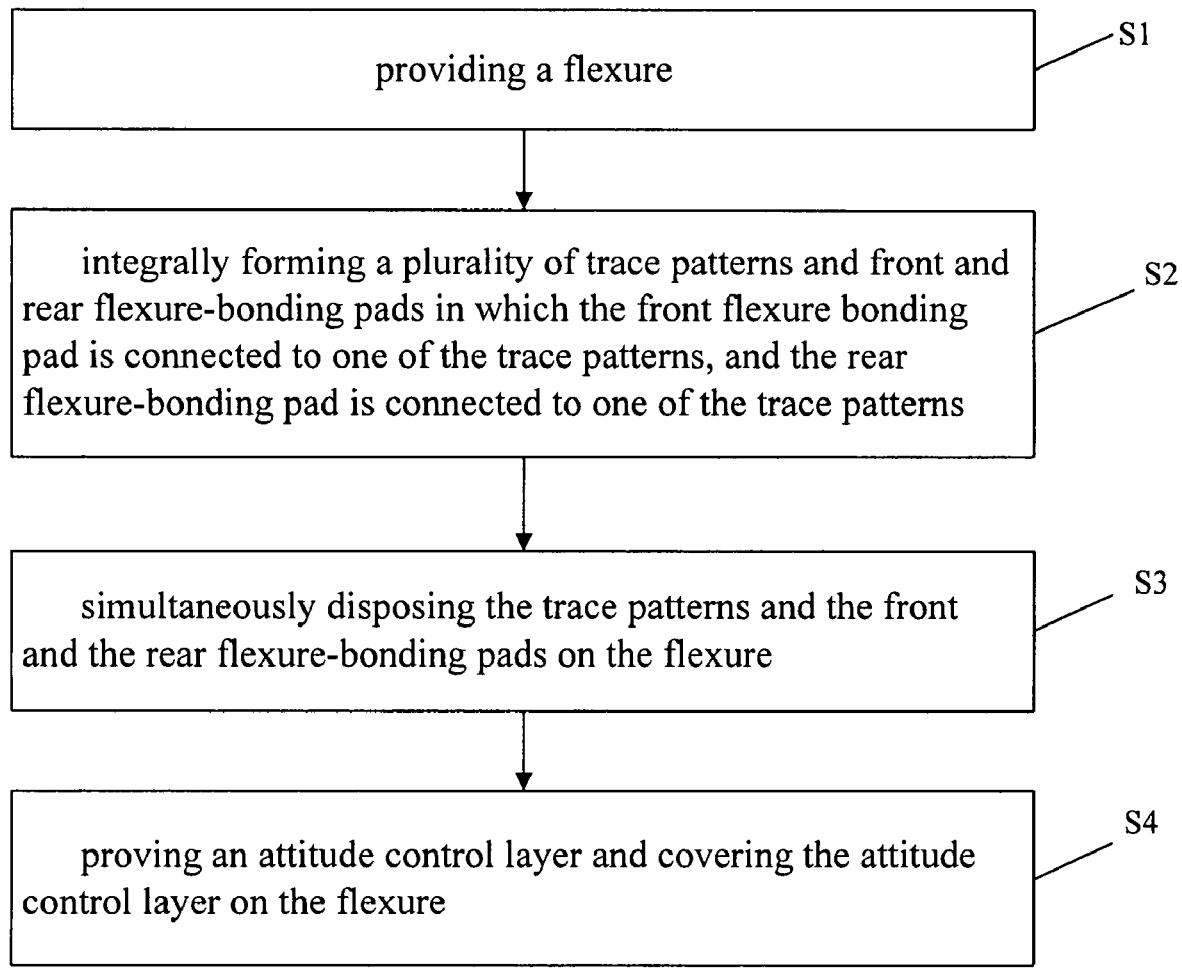
FIG. 23 is an example flowchart illustrating a method for fabricating the suspension according to the present invention.

FIG. 23 is an example flowchart illustrating a method for fabricating the suspension. According to the flowchart, steps of the fabricating method for the suspension are as follows: S1, providing a flexure; S2, integrally forming a plurality of trace patterns and front and rear flexure-bonding pads in which the front flexure bonding pad is connected to one of the trace patterns, and the rear flexure-bonding pad is connected to one of the trace patterns; S3, simultaneously disposing the trace patterns and the front and the rear flexure-bonding pads on the flexure; and S4, providing an attitude control layer and partially covering the attitude control layer on the flexure.

In comparison with the prior art, the present invention not only connects the head slider to the suspension in a single way without using epoxy adhesive, but also connects the flexure-bonding pads to the trace patterns so as to simultaneously dispose the flexure-bonding pads and the trace patterns on the flexure, thereby simplifying the fabricating process and avoiding alignment problem for bonding location. This can ensure the connection strength and connection location between the head slider and the suspension changeless, accordingly reduce variation of the head slider's pitch static attitude and roll static attitude and improve flying performance of the head slider, as well as data reading/writing performance.

In addition, the front and the rear flexure-bonding pads are connected with each other and connected to common ground so that the head slider has equal potential level at the leading edge and the trailing edge thereof, thus, improves the head slider the performance of preventing electrostatic discharge.

Moreover, the attitude control layer serves as a datum plate for supporting the head slider, so the head slider can be easily aligned with the flexure so as to ensure a good attitude of the head slider, thereby further improve flying performance of the head slider, as well as data reading/writing performance.

The foregoing description of the present invention has been presented for purposes of illustration and description. It is not intended to be exhaustive or limit the invention to the precise form disclosed, and obviously many modifications and variations are possible in light of the above teaching. Such modifications and variations that may be apparent to those skilled in the art are intended to be included within the scope of this invention as defined by the accompanying claims.

What is claimed is:

1. A suspension adapted for supporting a head slider comprising:
   a flexure;
   a plurality of trace patterns disposed on the flexure and an attitude control layer at least partially covered on the trace patterns;
   at least one front flexure-bonding pad disposed on the flexure at a position corresponding to a leading edge of the head slider for connecting with the leading edge of the slider by ball bonding and connected to one of the trace patterns; and
   at least one rear flexure-bonding pad disposed on the flexure at a position corresponding to a trailing edge of the head slider for connecting with the trailing edge of the slider by ball bonding and connected to one of the trace patterns.

2. The suspension according to claim 1, wherein the front flexure-bonding pad is connected to ground.

3. The suspension according to claim 2, wherein the front flexure-bonding pad is connected to the rear flexure-bonding pad.

4. The suspension according to claim 1, further comprising an attitude control layer at least partially covered on the flexure.

5. The suspension according to claim 4, wherein the attitude control layer is integrally formed with the flexure and extends above the trace patterns.

6. A head gimbal assembly comprising:
   a head slider having at least one front slider-bonding pad at a leading edge thereof and at least one rear slider-bonding pad at a trailing edge thereof; and
   a suspension comprising an attitude control layer positioned between the suspension and the head slider, the suspension further comprising:
   a flexure;
   a plurality of trace patterns disposed on the flexure;
   at least one front flexure-bonding pad disposed on the flexure at a position corresponding to the leading edge of the head slider and connected to one of the trace patterns, the front flexure-bonding pad being connected to the front slider-bonding pad by ball bonding; and
   at least one rear flexure-bonding pad disposed on the flexure at a position corresponding to the trailing edge of the head slider and connected to one of the trace patterns, the rear flexure-bonding pad being connected to the rear slider-bonding pad by ball bonding.

7. The head gimbal assembly according to claim 6, wherein the front flexure-bonding pad is connected to ground.

8. The head gimbal assembly according to claim 7, wherein the front flexure-bonding pad is connected to the rear flexure-bonding pad.

9. The head gimbal assembly according to claim 7, wherein the attitude control layer is at least partially covered on the flexure.

10. The head gimbal assembly according to claim 9, wherein the attitude control layer is integrally formed with the flexure and extends above the trace patterns to support the head slider.

11. The head gimbal assembly according to claim 7, wherein the attitude control layer is at least partially covered on the trace patterns.

12. A disk drive device comprising:
   a head gimbal assembly;
   a drive arm to connect with the head gimbal assembly;

a disk; and a spindle motor to spin the disk;

wherein the head gimbal assembly comprises:

a head slider having at least one front slider-bonding pad at a leading edge thereof and at least one rear slider-bonding pad at a trailing edge thereof; and a suspension, the suspension comprising:

a flexure comprising an attitude control layer positioned between the flexure and the head slider;

a plurality of trace patterns disposed on the flexure;

at least one front flexure-bonding pad disposed on the flexure at a position corresponding to the leading edge of the head slider and connected to one of the trace patterns, the front flexure-bonding pad being connected to the front slider-bonding pad by ball bonding; and at least one rear flexure-bonding pad disposed on the flexure at a position corresponding to the trailing edge of the head slider and connected to one of the trace patterns, the rear flexure-bonding pad being connected to the rear slider-bonding pad by ball bonding.

13. The disk drive device according to claim 12, wherein the front flexure-bonding pad is connected to ground.

14. The disk drive device according to claim 13, wherein the front flexure-bonding pad is connected to the rear flexure-bonding pad.

15. A method for fabricating a suspension comprising steps of:

(1) providing a flexure;

(2) integrally forming a plurality of trace patterns and front and rear flexure-bonding pads, the front flexure bonding pad being connected to one of the trace patterns by ball bonding, and the rear flexure-bonding pad being connected to one of the trace patterns by ball bonding;

(3) simultaneously disposing the trace patterns and the front and the rear flexure-bonding pads on the flexure;

(4) providing an attitude control layer and covering the attitude control layer on the flexure.

* * * * *